(12) United States Patent
Takahashi

(10) Patent No.: US 9,231,495 B2
(45) Date of Patent: Jan. 5, 2016

(54) FOUR-WIRE ELECTROSTATIC ACTUATOR AND STATOR

(75) Inventor: Norio Takahashi, Kita-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 521 days.

(21) Appl. No.: 13/639,000

(22) PCT Filed: Apr. 28, 2011

(86) PCT No.: PCT/JP2011/060424
§ 371 (c)(1),
(2), (4) Date: Oct. 2, 2012

(87) PCT Pub. No.: WO2011/145452
PCT Pub. Date: Nov. 24, 2011

(65) Prior Publication Data
US 2013/0020904 A1    Jan. 24, 2013

(30) Foreign Application Priority Data

May 19, 2010  (JP) .................................. 2010-115322

(51) Int. Cl.
  *H02N 1/00*  (2006.01)
(52) U.S. Cl.
  CPC .................................... *H02N 1/004* (2013.01)
(58) Field of Classification Search
  CPC ................................. H02N 1/004; H02N 1/08
  USPC .......................................... 310/300, 309, 308
  See application file for complete search history.

(56) References Cited

U.S. PATENT DOCUMENTS 5,055,731 A * 10/1991 Nihei et al. .................... 310/309
5,986,381 A * 11/1999 Hoen et al. .................... 310/309
(Continued)

FOREIGN PATENT DOCUMENTS

JP    03-065081 A1    3/1991
JP    06-121550 A1    4/1994
(Continued)

OTHER PUBLICATIONS

International Search Report dated Jun. 21, 2011.
(Continued)

*Primary Examiner* — Joshua Benitez Rosario
*Assistant Examiner* — Leda Pham
(74) *Attorney, Agent, or Firm* — Burr & Brown, PLLC

(57) ABSTRACT

A four-wire electrostatic actuator including: a stator having a substrate with two surfaces and at least four main-movement linear electrodes separately provided on one surface of the substrate and arranged in parallel at regular intervals; and a movable element disposed on the stator. The first and third main-movement linear electrodes of the four main-movement linear electrodes are supplied with rectangular wave signals or sine wave signals with reversed phases. The second and fourth main-movement linear electrodes are supplied with rectangular wave signals or sine wave signals with reversed phases. The two signals inputted to the adjacent two electrodes are shifted from each other by a quarter of a period with identical strength. The stator further includes a plurality of one-side auxiliary-movement linear electrodes on one side of the four main-movement linear electrodes, the auxiliary-movement linear electrodes being extended perpendicularly to the four main-movement linear electrodes.

9 Claims, 4 Drawing Sheets

(56) References Cited

U.S. PATENT DOCUMENTS

2004/0189144 A1* 9/2004 Gondoh .................. 310/309
2008/0112744 A1    5/2008 Saito

FOREIGN PATENT DOCUMENTS

| | | |
|---|---|---|
| JP | 07-222464 A1 | 8/1995 |
| JP | 2001-136759 A1 | 5/2001 |
| JP | 2006-033977 A1 | 2/2006 |
| JP | 2008-125300 A1 | 5/2008 |
| JP | 2009-169181 A1 | 7/2009 |

OTHER PUBLICATIONS

Japanese Office Action (Application No. 2010-115322) dated Jan. 21, 2014 (with English translation).

* cited by examiner

FOUR-WIRE ELECTROSTATIC ACTUATOR AND STATOR

FIELD OF THE INVENTION

The present invention relates to four-wire (four-phase) electrostatic actuators driven by four-phase signals.

BACKGROUND ART

A conventional electrostatic actuator includes a stator provided with electrodes and a movable element having a resistance element such as a film. For such an electrostatic actuator, a driving method is used with multiphase signals.

Unfortunately, in such an electrostatic actuator, a movable element linearly moving on a stator may meander or laterally deviate due to in-plane variations in friction resistance or foreign matters.

To address this problem, a conventional electrostatic actuator is provided with a guide that prevents meandering and a lateral deviation of a movable element. However, a friction resistance between the guide and the movable element may interfere with a movement of the movable element, and friction between the guide and the movable element may cause an unnecessary electric charge. Moreover, the movable element is regulated by the position of the guide but a restoring force to the center is not applied to the movable element.

Thus, a conventional electrostatic actuator has voltage supply lines on both sides of electrodes along the direction of movement of a movable element (for example, JP03-65081). With this configuration, a moment component perpendicular to the direction of movement of the movable element is fixed by the electrostatic force of the two voltage supply lines on both sides of the electrodes. Thus, the occurrence of a rotation moment on the movable element is suppressed, preventing meandering of the movable element.

In the conventional electrostatic actuator; unfortunately, the movable element is attracted to the voltage supply lines by the electrostatic force of the voltage supply lines, increasing the friction resistance of the movable element. Since the electrostatic force of the voltage supply lines does not contain a moment component that restores the movable element to the center of a stator, a restoring force to the center of the stator is not applied to the movable element and the movable element keeps moving while being deviated from the center of the stator.

SUMMARY OF THE INVENTION

The present invention provides a four-wire electrostatic actuator that can correct a movement of a movable element with lower friction resistance.

A four-wire electrostatic actuator according to one aspect of the invention, comprising:

a stator that includes a substrate having one surface and an other surface and at least four main-movement linear electrodes separately provided on the one surface of the substrate and arranged in parallel at regular intervals; and a movable element disposed on the stator, wherein of the four main-movement linear electrodes, the first main-movement linear electrode and the third main-movement linear electrode are supplied with rectangular wave signals or sine wave signals with reversed phases, and the second main-movement linear electrode and the fourth main-movement linear electrode are supplied with rectangular wave signals or sine wave signals with reversed phases, the two signals inputted to the adjacent two electrodes are shifted from each other by a quarter of a period with, identical strength, the stator further includes a plurality of one-side auxiliary-movement linear electrodes on one side of the four main-movement linear electrodes, the auxiliary-movement linear electrodes being extended perpendicularly to the four main-movement linear electrodes, and the one-side auxiliary-movement linear electrodes are supplied with rectangular wave signals or sine wave signals with different phases.

In the four-wire electrostatic actuator, the stator further includes a plurality of other-side auxiliary-movement linear electrodes on other side of the four main-movement linear electrodes, the auxiliary-movement linear electrodes being extended perpendicularly to the four main-movement linear electrodes, and the other-side auxiliary-movement linear electrodes are supplied with rectangular wave signals or sine wave signals with different phases.

In the four-wire electrostatic actuator, the one-side auxiliary-movement linear electrodes and the other-side auxiliary-movement linear electrodes are symmetric with respect to the four main-movement linear electrodes on both sides of the four main-movement linear electrodes.

In the four-wire electrostatic actuator, wherein of the one-side auxiliary-movement linear electrodes, the first one-side auxiliary-movement linear electrode and the third one-side auxiliary-movement linear electrode are supplied with the rectangular wave signals or the sine wave signals with reversed phases, the second one-side auxiliary-movement linear electrode and the fourth one-side auxiliary-movement linear electrode are supplied with the rectangular wave signals or the sine wave signals with reversed phases, and the two signals inputted to the adjacent two one-side auxiliary-movement linear electrodes are shifted by a quarter of a period with identical strength.

In the four-wire electrostatic actuator wherein of the other-side auxiliary-movement linear electrodes, the first other-side auxiliary-movement linear electrode and the third other-side auxiliary-movement linear electrode are supplied with the rectangular wave signals or the sine wave signals with reversed phases, the second one-side auxiliary-movement linear electrode and the fourth other-side auxiliary-movement linear electrode are supplied with the rectangular wave signals or the sine wave signals with reversed phases, and the two signals inputted to the adjacent two other-side auxiliary-movement linear electrodes are shifted by a quarter of a period with identical strength.

In the four-wire electrostatic actuator, the number of one-side auxiliary-movement linear electrodes is larger than the number of other-side auxiliary-movement linear electrodes.

In the four-wire electrostatic actuator, the movable element coming close to the one-side auxiliary-movement linear electrodes is moved to the four main-movement linear electrodes.

A stator according to one aspect of the invention, comprising: a substrate having one surface and an other surface; and at least four main-movement linear electrodes separately provided on the one surface of the substrate and arranged in parallel at regular intervals, wherein a movable element disposed on the stator, and wherein of the four main-movement linear electrodes, the first main-movement linear electrode and the third main-movement linear electrode are supplied with rectangular wave signals or sine wave signals with reversed phases, and the second main-movement linear electrode and the fourth main-movement linear electrode are supplied with rectangular wave signals or sine wave signals with reversed phases, the two signals inputted to the adjacent two electrodes shifted from each other by a quarter of a period with identical strength, the stator further includes a plurality of one-side auxiliary-movement linear electrodes on one side of the four main-movement linear electrodes, the auxiliary-movement linear electrodes being extended perpendicularly to the four main-movement linear electrodes, and the one-side auxiliary-movement linear electrodes are supplied with rectangular wave signals or sine wave signals with different phases.

In the stator, the movable element coming close to the one-side auxiliary-movement linear electrodes is moved to the four main-movement linear electrodes.

In the four-wire electrostatic actuator according to the present invention, a plurality of one-side auxiliary-movement linear electrodes extended perpendicularly to four main-movement linear electrodes are provided on one side of the four main-movement linear electrodes. The one-side auxiliary-movement linear electrodes are supplied with rectangular wave signals or sine wave signals with different phases, so that a movable element coming closer to the one-side auxiliary-movement linear electrodes is moved to the four main-movement linear electrodes.

Hence, a movement of the movable element can be corrected with lower friction resistance.

DETAILED DESCRIPTION OF THE INVENTION

An embodiment of a four-wire electrostatic actuator according to the present invention will be described below with reference to the accompanying drawings.

Figure 1:
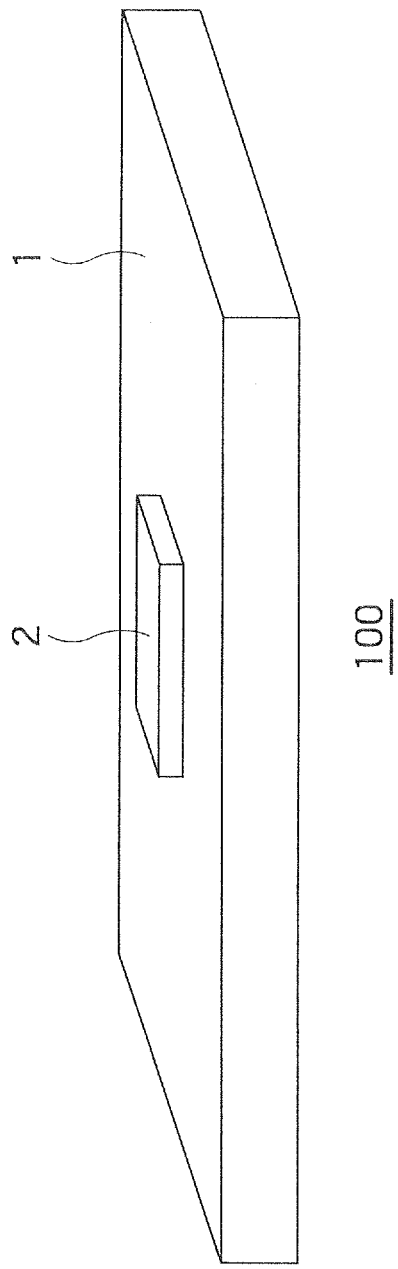
FIG. 1 is a perspective view illustrating an example of the configuration of a four-wire electrostatic actuator 100 according to the present invention.
Figure 2:
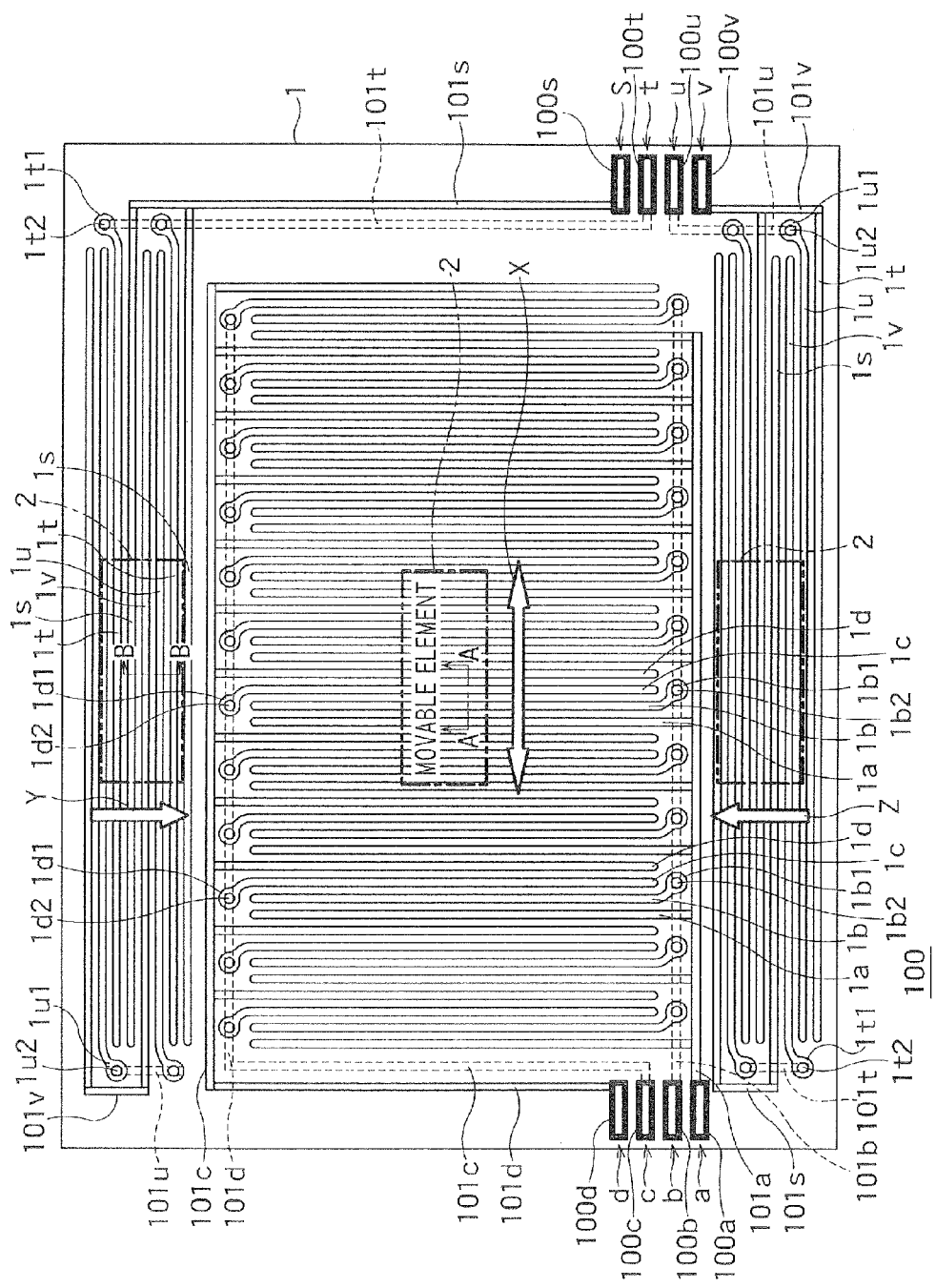
FIG. 2 is a top view schematically illustrating the four-wire electrostatic actuator 100 of FIG. 1.
Figure 3:
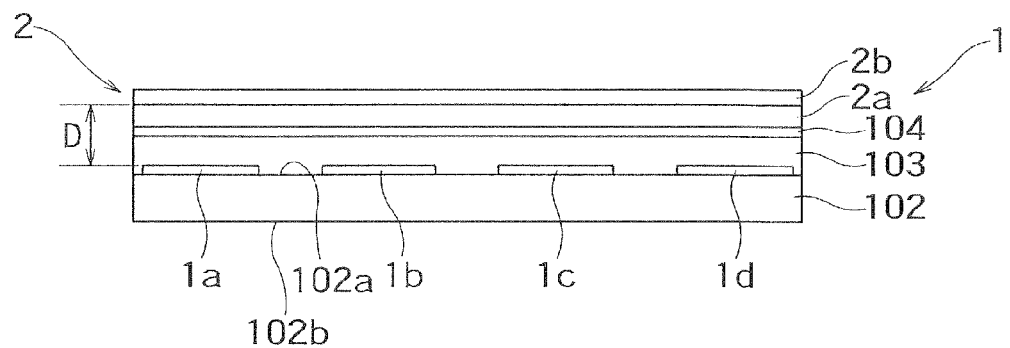
FIG. 3 is a cross-sectional view of the four-wire electrostatic actuator 100, taken along line A-A of FIG. 2.
Figure 4:
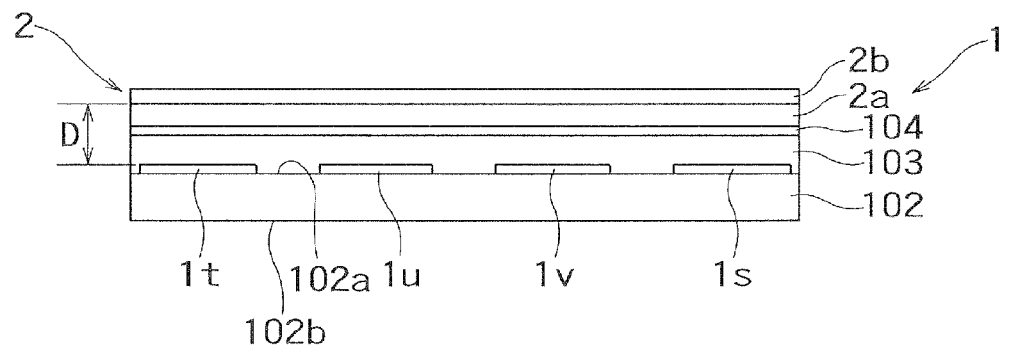
FIG. 4 is a cross-sectional view of the four-wire electrostatic actuator 100, taken along line B-B of FIG. 2.

FIG. 1 is a perspective view illustrating an example of the configuration of a four-wire electrostatic actuator 100 according to the present invention. FIG. 2 is a top view schematically illustrating the four-wire electrostatic actuator 100 of FIG. 1. FIG. 3 is a cross-sectional view of the four-wire electrostatic actuator 100, taken along line A-A of FIG. 2. FIG. 4 is a cross-sectional view of the four-wire electrostatic actuator 100, taken along line B-B of FIG. 2. For simplification, a cover film 103 and a sliding structure film 104 are omitted in FIG. 2.

As illustrated in FIGS. 1 and 2, the four-wire electrostatic actuator 100 includes a stator 1 and a movable element 2 movably placed on the stator 1. The stator 1 includes a substrate 102 having one surface 102a and an other surface 102b, at least four main-movement linear electrodes 1a to 1d that are separately provided in parallel at regular intervals on the one surface 102a of the substrate 102, and a plurality of auxiliary-movement linear electrodes 1s to 1v that are separately provided in parallel at regular intervals on the one surface 102a of the substrate 102.

In the following explanation, the auxiliary-movement linear electrodes 1s to 1v extended perpendicularly to the main-movement linear electrodes 1a to 1d on one side (the lower part in FIG. 2) of the main-movement linear electrodes 1a to 1d may be referred to as one-side auxiliary-movement linear electrodes, and the auxiliary-movement linear electrodes 1s to 1v extended perpendicularly to the main-movement linear electrodes 1a to 1d on the other side (the upper part in FIG. 2) of the main-movement linear electrodes 1a to 1d may be referred to as other-side auxiliary-movement linear electrodes.

The stator 1 will be specifically described below. As described above, the stator 1 includes the substrate 102, the at least four conductive main-movement linear electrodes 1a to 1d provided on the one surface 102a of the substrate 102, and the conductive auxiliary-movement linear electrodes 1s to 1v provided on the surface 102a of the substrate 102.

Of the four main-movement linear electrodes 1a to 1d, the first main-movement linear electrode 1a and the third main-movement linear electrode 1c are supplied with rectangular wave signals or sine wave signals with reversed phases while the second main-movement linear electrode 1b and the fourth main-movement linear electrode 1d are supplied win rectangular wave signals or sine wave signals with reversed phases.

The two signals inputted to the adjacent two electrodes, for example, the first main-movement linear electrode 1a and the second main-movement linear electrode 1b are shifted from each other by a quarter of a period with identical strength.

On one side (a lower part in FIG. 2) of the four main-movement linear electrodes 1a to 1d, a first main-movement bus line 101a and a second main-movement bus line 101b are provided in parallel. The first main-movement bus line 101a and the second main-movement bus line 101b are extended perpendicularly to the four main-movement linear electrodes 1a to 1d and are connected to the first main-movement linear electrode 1a and the second main-movement linear electrode 1b, respectively.

On the other side (an upper part in FIG. 2) of the four main-movement linear electrodes 1a to 1d, a third main-movement bus line 1c and a fourth main-movement bus line 1c are provided in parallel. The third main-movement bus line 1c and the fourth main-movement bus line 1d are extended perpendicularly to the four main-movement linear electrodes 1a to 1d and are connected to the third main-movement linear electrode 1c and the fourth main-movement linear electrode 1d, respectively.

As described above, on one side (the lower part in FIG. 2) of the four main-movement linear electrodes 1a to 1d, the one-side auxiliary-movement linear electrodes 1s to 1v (two sets of four electrodes, eight electrodes in total) are extended perpendicularly to the four main-movement linear electrodes 1a to 1d.

Moreover, as described above, on the other side (the upper part in FIG. 2) of the four main-movement linear electrodes 1a to 1d, the other-side auxiliary-movement linear electrodes 1s to 1v (two sets of four electrodes, eight electrodes in total) are extended perpendicularly to the four main-movement linear electrodes, The one-side auxiliary-movement linear electrodes 1s to 1v and the other-side auxiliary-movement linear electrodes 1s to 1v are symmetric with respect to the four main-movement linear electrodes 1a to 1d on both sides of the four main-movement linear electrodes (the sets of eight electrodes are disposed under the same wiring rule in the present embodiment).

The number of one-side auxiliary-movement linear electrodes 1s to 1v may be larger than the number of other-side auxiliary-movement linear electrodes 1s to 1v. Thus, for example, in the case where the movable element 2 is separated from the center of the stator 1 by a force (gravity) on the four-wire electrostatic actuator 100 fixed on a wall, an auxiliary force can be additionally applied in the opposite direction from the force (in this case, an auxiliary movement direction Z).

Since the auxiliary-movement linear electrodes 1s to 1v are provided on both sides of the main-movement linear electrodes 1s to 1d, the auxiliary-movement linear electrodes 1s to 1v can be used not only for correcting the position of the movable element 2 but also for moving the movable element 2 in a zigzag with respect to a main movement direction X by actively using an auxiliary movement direction Y and the auxiliary movement direction Z perpendicularly to the main movement direction X.

Of the four one-side auxiliary-movement linear electrodes 1s to 1v, the first one-side auxiliary-movement linear electrode is and the third one-side auxiliary-movement linear electrode 1u are supplied with rectangular wave signals or sine wave signals with reversed phases while the second one-side auxiliary-movement linear electrode 1t and the fourth one-side auxiliary-movement linear electrode 1v are supplied with rectangular wave signals or sine wave signals with reversed phases.

The two signals inputted to the adjacent two one-side auxiliary-movement linear electrodes, for example, the first one-side auxiliary-movement linear electrode 1s and the second one-side auxiliary-movement linear electrode 1t are shifted from each other by a quarter of a period with identical strength.

In other words, the one-side auxiliary-movement linear electrodes 1s to 1v are supplied with the rectangular wave signals or the sine wave signals with different phases, so that the movable element 2 coming close to the one-side auxiliary-movement linear electrodes 1s to 1v is moved to the four main-movement linear electrodes 1a to 1d (auxiliary movement direction Z).

Of the four other-side auxiliary-movement linear electrodes 1s to 1v, the first other-side, the first other-side auxiliary-movement linear electrode 1s and the third other-side auxiliary-movement linear electrode 1u are supplied with rectangular wave signals or sine wave signals with reversed phases while the second other-side auxiliary-movement linear electrode 1t and the fourth other-side auxiliary-movement linear electrode 1v are supplied with rectangular wave signals or sine wave signals with reversed phases.

The two signals inputted to the adjacent two other-side auxiliary-movement linear electrodes, for example, the first other-side auxiliary-movement linear electrode 1s and the second other-side auxiliary-movement linear electrode 1t are sifted from each other by a quarter of a period with identical strength.

In other words, the other-side auxiliary-movement linear electrodes 1s to 1v are supplied with the rectangular wave signals or the sine wave signals with different phases, so that the movable element 2 coming close to the other-side auxiliary-movement linear electrodes 1s to 1v is moved to the four main-movement linear electrodes 1a to 1d (auxiliary movement direction Y).

As illustrated in FIG. 2, a first auxiliary-movement bus line 101s and a second auxiliary-movement bus line 101t are provided in parallel which are connected to the first auxiliary-movement linear electrode 1s and the second auxiliary-movement linear electrode it, respectively.

Moreover, a third auxiliary-movement bus line 101u and a fourth auxiliary-movement bus line 101v are provided in parallel which are connected to the third auxiliary-movement linear electrode 1u and the fourth auxiliary-movement linear electrode 1v, respectively.

As illustrated in FIGS. 3 and 4, the cover film 103 is provided over the main-movement linear electrodes 1a to 1d and the auxiliary-movement linear electrodes 1s to 1v which are provided on the one surface 102a of the substrate 102. Furthermore, the sliding structure film 104 is provided over the cover film 103.

The substrate 102 is, for example, 25 μm in thickness. A material used for the substrate 102 is selected from, for example, polyimide, glass epoxy resin, phenol resin, PET (polyethylene terephthalate), PET-G (terephthalic acid-cyclohexanedimethanol-ethylene glycol copolymer), PEN (polyethylene naphthalate), PP (polypropylene), PE (polyethylene), PC (polycarbonate), PA (polyamide), PPS (polyphenylene sulfide), polyvinyl chloride, vinyl chloride-vinyl acetate copolymer, cellulose diacetate, cellulose triacetate, polystyrenes, ABS, polyacrylic ester, polyethylene, and polyurethane. Particularly, PEN is preferable because of its high thermal resistance and strength.

As described above, the main-movement linear electrodes 1a to 1d and the auxiliary-movement linear electrodes 1s to 1v are separately provided on the one surface 102a of the substrate 102 and are repeatedly arranged in parallel like comb teeth at regular intervals. The main-movement linear electrodes 1a to 1d and the auxiliary-movement linear electrodes 1s to 1v are set with pitches of, for example, 0.3 mm or less and are about 1500 Å in thickness (see FIGS. 2 to 4) when an electrode material formed on a PET substrate is, for example, ITO (indium tin oxide).

As illustrated in FIG. 2, the two first and second main-movement bus lines 101a and 101b are shaped like belts and are provided as described above, on one side (the lower part in FIG. 2) of the main-movement linear electrodes 1a to 1d.

In this configuration, the first main-movement bus line 101a is provided on the one surface (top surface) 102a of the substrate 102 and is electrically connected to the first main-movement linear electrode 1a.

The second main-movement bus line 101b is provided on the other surface (undersurface) 102b of the substrate 102 and is electrically connected to the second main-movement linear electrode 1b. The substrate 102 further includes through-hole wires 1b2 that penetrate the substrate 102 and are connected to the second main-movement bus line 101b provided on the other surface 102b of the substrate 102. The one surface 102a of the substrate 102 has pad electrodes 151, each connecting one side of the second main-movement linear electrode 1b and the through-hole wire 1b2.

Thus, the second main-movement bus line 101b is electrically connected to the second main-movement linear electrode 1b.

The two third and fourth main-movement bus lines 101c and 101d are shaped like belts and are provided, as described above, on the other side (the upper part of FIG. 2) of the main-movement linear electrodes 1a to 1d.

The third main-movement bus line 101c is provided on the one surface (top surface) 102a of the substrate 102 and is electrically connected to the third main-movement linear electrode 1c.

The fourth main-movement bus line 101d is provided on the other surface (undersurface) 102b of the substrate 102 and is electrically connected to the fourth main-movement linear electrode 1d. The substrate 102 has through-hole wires 1d2 that penetrate the substrate 102 and are connected to the fourth main movement bus line 101d provided on the other surface 102b of the substrate 102. The one surface (top surface) 102a of the substrate 102 has pad electrodes 1d1, each connecting one side of the fourth main-movement linear electrode 1d and the through-hole wire 1d2.

Thus, the fourth main movement bus line 101d is electrically connected to the fourth main-movement linear electrode 1d.

As illustrated in FIG. 2, the two first and second auxiliary-movement bus lines 101s and 101t are shaped like belts. The first and second auxiliary-movement bus lines 101s and 101t on the lower right (not shown) are connected to external connection terminals 100s and 100 t.

The first auxiliary-movement bus line 101s is provided on the one surface (top surface) 102a of the substrate 102 and is electrically connected to the first auxiliary-movement linear electrode 1s.

The second auxiliary-movement bus line 101t is provided on the other surface (undersurface) 102b of the substrate 102 and is electrically connected to the second auxiliary-movement linear electrode 1t. The substrate 102 further includes through-hole wires 1t2 that penetrate the substrate 102 and are connected to the second auxiliary-movement bus line 101t provided on the other surface 102b of the substrate 102. The one surface 102a of the substrate 102 has pad electrodes 1t1, each connecting one side of the second auxiliary-movement linear electrode 1t and the through-hole wire 112.

Thus, the second auxiliary-movement bus line 101t is electrically connected to the second auxiliary-movement linear electrode 1t.

The two third and fourth auxiliary-movement bus lines 101u and 101v are shaped like belts. The third and fourth auxiliary-movement bus lines 101u and 101v on the lower left (not shown) are connected to external connection terminals 100u and 100v.

The third auxiliary-movement bus line 101u is provided on the one surface (top surface) 102a of the substrate 102 and is electrically connected to the third auxiliary-movement linear electrode 1u.

The fourth auxiliary-movement bus line 101v is provided on the other surface (undersurface) 102b of the substrate 102 and is electrically connected to the fourth auxiliary-movement linear electrode 1v. The substrate 102 includes through-hole wires 1v2 that penetrate the substrate 102 and are connected to the fourth auxiliary-movement bus line 101v provided on the other surface 102b of the substrate 102. The one surface (top surface) 102a of the substrate 102 has pad electrodes 1v1, each connecting one side of the fourth auxiliary-movement linear electrode 1v and the through-hole wire 1v2.

Thus, the fourth auxiliary-movement bus line 101v is electrically connected to the fourth auxiliary-movement linear electrode 1v.

In FIG. 2, the first auxiliary-movement bus line 101s includes partially separated regions which are electrically connected to each other via wires (not shown). The other auxiliary-movement bus lines 101t to 101v include similar regions.

Referring to FIGS. 3 and 4, the cover film 103 and the sliding structure film 104 of the stator 1 will be specifically described below.

As illustrated in FIGS. 3 and 4, the cover film 103 is provided on the substrate 102 so as to cover the main-movement linear electrodes 1a to 1d and the auxiliary-movement linear electrodes 1s to 1v. The cover film 103 is, for example, 12.5 μm in thickness. A material used for the cover film 103 is, for example, polyimide.

The sliding structure film 104 is provided on the cover film 103. The sliding structure film 104 is slidable on the undersurface of the movable element 2 (the undersurface of a base film 2a, which will be described later). For example, the sliding structure film 104 has a thickness of several nm. A material used for the sliding structure film 104 is, for example, silicon.

A distance D from the top surfaces of the main-movement linear electrodes 1s to 1d and the auxiliary-movement linear electrodes is to 1v to the charged surface (undersurface) of a resistive film 2b is set at, for example, 30 μm to 150 μm.

Referring to FIGS. 1 and 2, the movable element 2 will be specifically described below, As illustrated in FIGS. 1 and 2, the movable element 2 is disposed on the stator 1. As illustrated in FIGS. 3 and 4, the movable element 2 includes the base film 2a and the resistive film 2b.

The base film 2a is opposed to the stator 1 and is in contact with the stator 1. The base film 2a is, for example, about 25 μm in thickness.

A material used for the base film 2a is selected from, for example, PET (polyethylene terephthalate), PET-G (terephthalic acid-cyclohexanedimethanol-ethylene glycol copolymer), PEN (polyethylene naphthalate), PP (polypropylene), PE (polyethylene), PC (polycarbonate), PA (polyamide), PPS (polypenylene sulfide), polyvinyl chloride, vinyl chloride-vinyl acetate copolymer, cellulose diacetate, cellulose triacetate, polystyrenes, ABS, polyacrylic ester, polyethylene, and polyurethane. Particularly, PEN is preferable because of its high thermal resistance and strength.

The resistive film 2b is provided on the base film 2a. The resistive film 2b is, for example, about 1 μm in thickness. The resistive film 2b has a surface resistivity of, for example, $10^{11}$ to $10^{13}$ Ω/sq.

The effect of the present embodiment configured thus will be described below. First, a movement of the movable element 2 in the main movement direction X on the main-movement linear electrodes 1a to 1d will be described below.

First, as illustrated in FIG. 2, signals a to d are inputted from a driving circuit (not shown) to the four-wire electrostatic actuator 100 through first to fourth main-movement input terminals 100a to 100d. At this point, signals a to d are applied through the main-movement bus lines 101a to 101d, the through-hole wires 1b2 and 1d2, and the pad electrodes 1b1 and 1d1 to the main-movement linear electrodes 1a to 1d, respectively.

Figure 5:
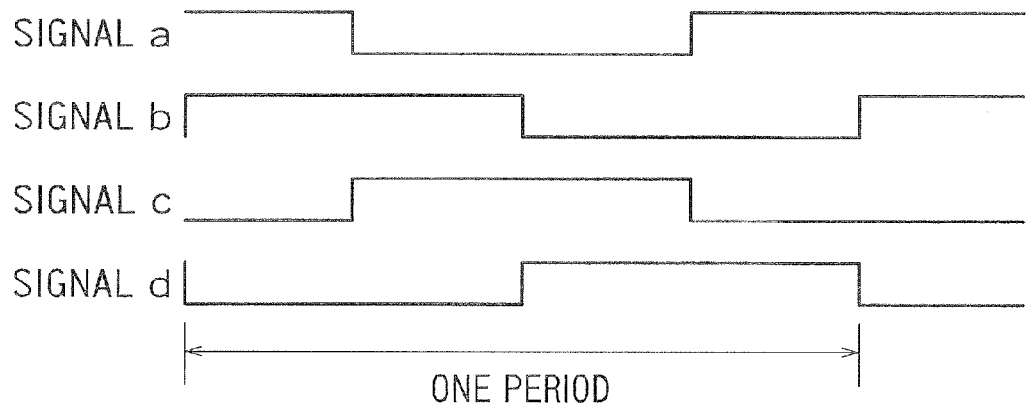
FIG. 5 is a waveform chart showing an example of the waveforms of the signals a to d applied to the main-movement linear electrodes 1a to 1d.

FIG. 5 is a waveform chart showing an example of the waveforms of the signals a to d applied to the main-movement linear electrodes 1a to 1d. In FIG. 5, the signals a to d have rectangular waves. Also in the case where the signals a to d have sine waves, the same phase relationship is established.

As shown in FIG. 5, the two signals a and b inputted to the adjacent main-movement linear electrodes 1a and 1b are shifted from each other by a quarter of a period. Similarly, the two signals b and c inputted to the adjacent main-movement linear electrodes 1b and 1c are shifted from each other by a quarter of a period. Also, the two signals c and d inputted to the adjacent main-movement linear electrodes 1c and 1d are shifted from each other by a quarter of a period.

In this case, the signals a to d have identical strength (amplitude). The absolute values of the amplitudes (voltages) of the signals a to d are set at, for example, 800 V or less.

Hence, the first main-movement linear electrode 1a and the third main-movement linear electrode 1c are supplied with the signals (rectangular wave signals or sine wave signals) a and c reversed in phase (phase-shifted by a half period). The second main-movement linear electrode 1b and the fourth main-movement linear electrode 1d are supplied with the signals (rectangular wave signals or sine wave signals) b and d reversed in phase (phase-shifted by a half period).

In this case, the resistive film 2b of the movable element 2 generates a charge in response to the signals a to d applied to the main-movement linear electrodes 1a to 1d. For example, as shown in FIG. 5, the signals a to d fluctuate in amplitude, allowing the movable element 2 to move on the stator 1 perpendicularly (in the main movement direction X) to the main-movement linear electrodes 1a to 1d according to electrostatic energy accumulated on the charged part of the movable element 2 and the main-movement linear electrodes 1a to 1d (FIG. 2).

In the following case, the movable element 2 is deviated from the main movement direction X onto the one-side auxiliary-movement linear electrodes 1s to 1v and then is moved by a force in the auxiliary movement direction Z. The movable element 2 deviated from the main movement direction X onto the other-side auxiliary-movement linear electrodes 1s to 1v is also moved by a force in the auxiliary movement direction Y.

Figure 6:
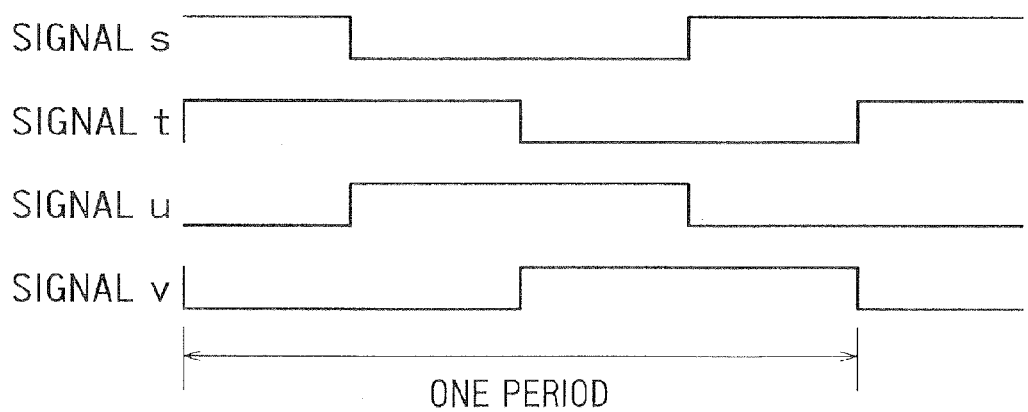
FIG. 6 is a waveform chart showing an example of the waveforms of signals s to v applied to the auxiliary-movement linear electrodes 1s to 1v.

FIG. 6 is a waveform chart showing an example of the waveforms of signals s to v applied to the auxiliary-movement linear electrodes 1s to 1v. In FIG. 6, the signals s to v have rectangular waves. Also in the case where the signals s to v have sine waves, the same phase relationship is established.

As shown in FIG. 6, the two signals s and t inputted to the adjacent one-side auxiliary-movement linear electrodes 1s and 1t are shifted from each other by a quarter of a period. Similarly, the two signals t and u inputted to the adjacent one-side auxiliary-movement linear electrodes 1t and 1u are shifted from each other by a quarter of a period. Also, the two signals u and v inputted to the adjacent one-side auxiliary-movement linear electrodes 1u and 1v are shifted from each other by a quarter of a period.

In this case, the signals s to v have identical strength (amplitude). The absolute values of the amplitudes (voltages) of the signals s to v are set at, for example, 800 V or less.

Hence, the first one-side auxiliary-movement linear electrode 1s and the third one-side auxiliary-movement linear electrode 1u are supplied with the signals (rectangular wave signals or sine wave signals) s and u reversed in phase (phase-shifted by a half period). The second one-side auxiliary-movement linear electrode 1t and the fourth one-side auxiliary-movement linear electrode 1v are supplied with the signals (rectangular wave signals or sine wave signals) t and v reversed in phase (phase-shifted by a half period).

In this case, the resistive film 2b of the movable element 2 generates a charge in response to the signals s to v applied to the one-side auxiliary-movement linear electrodes 1s to 1v. For example, as shown in FIG. 6, the signals s to v fluctuate in amplitude, so that the movable element 2 is moved by a force on the stator 1 perpendicularly (in the auxiliary movement direction Z to the main-movement linear electrodes) to the one-side auxiliary-movement linear electrodes 1s to 1v according to electrostatic energy accumulated on the charged part of the movable element 2 and the one-side auxiliary-movement linear electrodes 1s to 1v (FIG. 2).

Thus, in the four-wire electrostatic actuator 100 according to the present embodiment, even when the movable element 2 is deviated from the main movement direction X, the movable element 2 coming close to the auxiliary-movement linear electrodes 1s to 1v is moved by a force in the auxiliary movement direction Z. In other words, a moment component is generated in a direction that returns the movable element to the center of the stator, allowing the movable element 2 to move to the main-movement linear electrodes without increasing the friction resistance of the movable element.

As described above, the four-wire electrostatic actuator according to the present embodiment can correct a movement of the movable element with lower friction resistance.

In the present embodiment, the number of auxiliary-movement linear electrodes is at least four. The number of auxiliary-movement linear electrodes may be three or less as long as a force can be applied in the auxiliary movement directions Y and Z to the main-movement linear electrodes.

The invention claimed is:

1. A four-wire electrostatic actuator comprising:
   a stator that includes a substrate having one surface and an other surface and at least four main-movement linear electrodes separately provided on the one surface of the substrate and arranged in parallel at regular intervals; and
   a movable element disposed on the stator,
   wherein of the four main-movement linear electrodes, the first main-movement linear electrode and the third main-movement linear electrode are supplied with rectangular wave signals or sine wave signals with reversed phases, and
   the second main-movement linear electrode and the fourth main-movement linear electrode are supplied with rectangular wave signals or sine wave signals with reversed phases,
   the two signals inputted to the adjacent two electrodes are shifted from each other by a quarter of a period with identical strength,
   the stator further includes a plurality of one-side auxiliary-movement linear electrodes on one side of the four main-movement linear electrodes, the one side auxiliary-movement linear electrodes being extended perpendicularly to the four main-movement linear electrodes, and
   the one-side auxiliary-movement linear electrodes are supplied with rectangular wave signals or sine wave signals with different phases,
   wherein the stator further includes a plurality of other-side auxiliary-movement linear electrodes on other side of the four main-movement linear electrodes, the other-side auxiliary-movement linear electrodes being extended perpendicularly to the four main-movement linear electrodes,
   the other-side auxiliary-movement linear electrodes are supplied with rectangular wave signals or sine wave signals with different phases, and
   the number of one-side auxiliary-movement linear electrodes is larger than the number of other-side auxiliary-movement linear electrodes.

2. The four-wire electrostatic actuator according to claim 1, wherein the one-side auxiliary-movement linear electrodes and the other-side auxiliary-movement linear electrodes are symmetric with respect to the four main-movement linear electrodes on both sides of the four main-movement linear electrodes.

3. The four-wire electrostatic actuator according to claim 2, wherein of the one-side auxiliary-movement linear electrodes, the first one-side auxiliary-movement linear electrode and the third one-side auxiliary-movement linear electrode are supplied with the rectangular wave signals or the sine wave signals with reversed phases, the second one-side auxiliary-movement linear electrode and the fourth one-side auxiliary-movement linear electrode are supplied with the rectangular wave signals or the sine wave signals with reversed phases, and the two signals inputted to the adjacent two one-side auxiliary-movement linear electrodes are shifted by a quarter of a period with identical strength.

4. The four-wire electrostatic actuator according to claim 1, wherein of the one-side auxiliary-movement linear electrodes, the first one-side auxiliary-movement linear electrode and the third one-side auxiliary-movement linear electrode are supplied with the rectangular wave signals or the sine wave signals with reversed phases, the second one-side auxiliary-movement linear electrode and the fourth one-side auxiliary-movement linear electrode are supplied with the rectangular wave signals or the sine wave signals with reversed phases, and the two signals inputted to the adjacent two one-side auxiliary-movement linear electrodes are shifted by a quarter of a period with identical strength.

5. The four-wire electrostatic actuator according to claim 1, wherein of the other-side auxiliary-movement linear electrodes, the first other-side auxiliary-movement linear electrode and the third other-side auxiliary-movement linear electrode are supplied with the rectangular wave signals or the sine wave signals with reversed phases, the second one-side auxiliary-movement linear electrode and the fourth other-side auxiliary-movement linear electrode are supplied with the rectangular wave signals or the sine wave signals with reversed phases, and the two signals inputted to the adjacent two other-side auxiliary-movement linear electrodes are shifted by a quarter of a period with identical strength.

6. The four-wire electrostatic actuator according to claim 2, wherein of the other-side auxiliary-movement linear electrodes, the first other-side auxiliary-movement linear electrode and the third other-side auxiliary-movement linear electrode are supplied with the rectangular wave signals or the sine wave signals with reversed phases, the second one-side auxiliary-movement linear electrode and the fourth other-side auxiliary-movement linear electrode are supplied with the rectangular wave signals or the sine wave signals with reversed phases, and the two signals inputted to the adjacent two other-side auxiliary-movement linear electrodes are shifted by a quarter of a period with identical strength.

7. The four-wire electrostatic actuator according to claim 1, wherein the movable element coming close to the one-side auxiliary-movement linear electrodes is moved to the four main-movement linear electrodes.

8. A stator comprising: a substrate having one surface and an other surface; and at least four main-movement linear electrodes separately provided on the one surface of the substrate and arranged in parallel at regular intervals, wherein a movable element disposed on the stator, and wherein of the four main-movement linear electrodes, the first main-movement linear electrode and the third main-movement linear electrode are supplied with rectangular wave signals or sine wave signals with reversed phases, and the second main-movement linear electrode and the fourth main-movement linear electrode are supplied with rectangular wave signals or sine wave signals with reversed phases, the two signals inputted to the adjacent two electrodes are shifted from each other by a quarter of a period with identical strength, the stator further includes a plurality of one-side auxiliary-movement linear electrodes on one side of the four main-movement linear electrodes, the one-side auxiliary-movement linear electrodes being extended perpendicularly to the four main-movement linear electrodes, and the one-side auxiliary-movement linear electrodes are supplied with rectangular wave signals or sine wave signals with different phases, wherein the stator further includes a plurality of other-side auxiliary-movement linear electrodes on other side of the four main-movement linear electrodes, the auxiliary-movement linear electrodes being extended perpendicularly to the four main-movement linear electrodes, the other-side auxiliary movement linear electrodes are supplied with rectangular wave signals or sine wave signals with different phase, and wherein the number of one-side auxiliary-movement linear electrodes is larger than the number of other-side auxiliary-movement linear electrodes.

9. The stator according to claim 8, wherein the movable element coming close to the one-side auxiliary-movement linear electrodes is moved to the four main-movement linear electrodes.

* * * * *